US012697683B2

(12) United States Patent
Son et al.

(10) Patent No.: US 12,697,683 B2
(45) Date of Patent: Aug. 4, 2026

(54) WELDING DEVICE FOR BUTTON-TYPE SECONDARY BATTERY

(71) Applicant: LG ENERGY SOLUTION, LTD., Seoul (KR)

(72) Inventors: Bu Won Son, Daejeon (KR); Jin Yeong Lee, Daejeon (KR); Jin Soo Lee, Daejeon (KR); Jae Won Lim, Daejeon (KR); Jeong Ho Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 720 days.

(21) Appl. No.: 18/029,837

(22) PCT Filed: Nov. 1, 2021

(86) PCT No.: PCT/KR2021/015610
§ 371 (c)(1),
(2) Date: Mar. 31, 2023

(87) PCT Pub. No.: WO2022/103041
PCT Pub. Date: May 19, 2022

(65) Prior Publication Data
US 2023/0405717 A1 Dec. 21, 2023

(30) Foreign Application Priority Data

Nov. 10, 2020 (KR) ........................ 10-2020-0149609

(51) Int. Cl.
*B23K 26/21* (2014.01)
*B23K 37/04* (2006.01)
(Continued)

(52) U.S. Cl.
CPC .......... *B23K 26/21* (2015.10); *B23K 37/0443* (2013.01); *G01N 27/20* (2013.01);
(Continued)

(58) Field of Classification Search
CPC ...... B23K 26/22; B23K 31/125; B23K 26/03; H01M 50/531; H01M 50/109
See application file for complete search history.

(56) References Cited

U.S. PATENT DOCUMENTS

| | | | |
|---|---|---|---|
| 10,010,974 | B2 | 7/2018 | Nakamura et al. |
| 2010/0140228 | A1 | 6/2010 | Suzuki et al. |

(Continued)

FOREIGN PATENT DOCUMENTS

| | | |
|---|---|---|
| CN | 101911273 A | 12/2010 |
| CN | 109311130 A | 2/2019 |

(Continued)

OTHER PUBLICATIONS

Extended European Search Report issued Dec. 14, 2023 for European Patent Application No. 21892211.0 Note: JP 2019-067570 A, KR 10-1775217 B1, US 2019/0240788 A1 & KR 10-0241029 B1 are of record.

(Continued)

*Primary Examiner* — Thien S Tran
(74) *Attorney, Agent, or Firm* — Morgan, Lewis & Bockius LLP

(57) ABSTRACT

A welding device welds an electrode tab protruding from an electrode assembly of a button-type battery to a can of the button-type battery. The welding device includes a base to support a bottom surface of the can when an inner surface of the can faces an upper side, and the electrode tab is in contact with the inner surface of the can; a jig on the base to fix the electrode tab on the base and having an opening hole through which a laser light for welding the electrode tab to the can passes; a laser irradiation device to irradiate the laser light to the opening hole when the jig fixes the electrode tab to the can; and four probes on the base or the jig. Two probes of the probes are connected to a power (Continued)

Welding

Sample number

Weak welding

Normal welding

Weak welding

Normal welding source, and the remaining two probes are connected to a voltmeter.

11 Claims, 7 Drawing Sheets

(51) Int. Cl.

| | | |
|---|---|---|
| *G01N 27/20* | (2006.01) | |
| *H01M 50/109* | (2021.01) | |
| *H01M 50/528* | (2021.01) | |
| *H01M 50/531* | (2021.01) | |

(52) U.S. Cl.
CPC ....... *H01M 50/109* (2021.01); *H01M 50/528* (2021.01); *H01M 50/531* (2021.01)

(56) References Cited

U.S. PATENT DOCUMENTS

| | | | |
|---|---|---|---|
| 2010/0285698 A1 | 11/2010 | Lee | |
| 2016/0146884 A1* | 5/2016 | Nasu | G01R 1/07307 |
| | | | 324/750.25 |
| 2016/0146885 A1 | 5/2016 | Ando et al. | |
| 2019/0240788 A1 | 8/2019 | Park et al. | |
| 2019/0321945 A1 | 10/2019 | Jung et al. | |
| 2021/0331268 A1 | 10/2021 | Chang et al. | |

FOREIGN PATENT DOCUMENTS

| | | |
|---|---|---|
| CN | 111354914 A | 6/2020 |
| CN | 111360405 A | 7/2020 |
| JP | 9-330695 A | 12/1997 |
| JP | H11-145216 A | 5/1999 |
| JP | 2003-123830 A | 4/2003 |
| JP | 2010-086899 A | 4/2010 |
| JP | 2010-205701 A | 9/2010 |
| JP | 2012245524 A * | 12/2012 |
| JP | 5205246 B2 | 6/2013 |
| JP | 2014-151360 A | 8/2014 |
| JP | 5602050 B2 | 10/2014 |
| JP | 2019-060769 A | 4/2019 |
| JP | 2019067570 A * | 4/2019 |
| KR | 10-1997-0033396 A | 7/1997 |
| KR | 10-0241029 B1 | 3/2000 |
| KR | 10-2008-0055173 A | 6/2008 |
| KR | 10-2010-0117746 A | 11/2010 |
| KR | 10-2016-0063284 A | 6/2016 |
| KR | 10-1775217 B1 | 9/2017 |
| KR | 10-2018-0122115 A | 11/2018 |
| KR | 10-1915151 B1 | 11/2018 |
| KR | 10-2094210 B1 | 3/2020 |
| KR | 10-2020-0058399 A | 5/2020 |

OTHER PUBLICATIONS

Office Action issued on May 27, 2025 in Chinese Patent Application No. 202180075343.2 (Note: JP 2019067570 A cited in this CN Office Action has already been cited in a prior IDS.).

Office Action issued Mar. 19, 2024 for Japanese Patent Application No. 2023-520065.

International Search Report (with partial translation) and Written Opinion dated Feb. 9, 2022, for corresponding International Patent Application No. PCT/KR2021/015610.

Office Action dated Sep. 25, 2024 issued in Korean Patent Application No. 10-2020-0149609. Note: JP 2019-067570 A and KR 10-0241029 B1 cited therein are already of record.

\* cited by examiner

Weak welding

Normal welding

WELDING DEVICE FOR BUTTON-TYPE SECONDARY BATTERY

TECHNICAL FIELD

The present application claims the benefit of the priority of Korean Patent Application No. 10-2020-0149609, filed on Nov. 10, 2020, which is hereby incorporated by reference in its entirety.

The present invention relates to a welding device for a button-type secondary battery, and more particularly, to a welding device which is capable of welding an electrode tab of an electrode assembly to an electrode tab by using a laser, wherein, after performing the welding by measuring a resistance value at a welding point, whether welding defects occur is quickly checked.

BACKGROUND ART

A button-type battery commonly used as a coin-type battery or a button-type battery has a thin button shape and is widely used in various devices such as remote controllers, clocks, toys, computer parts, and the like.

Such a button-type battery is mainly manufactured as a non-rechargeable primary battery, but is also widely manufactured as a secondary battery that is chargeable and dischargeable as miniaturized devices are developed.

Also, the button-type secondary battery also has a structure in which an electrode assembly and an electrolyte are embedded in a case to repeatedly perform charging and discharging, like the button-type secondary battery or the cylindrical or pouch-type secondary battery.

Particularly, the button-type secondary battery has a different property in that a structure is more simple, and a can has a low height, but is structurally similar in that a jelly roll-type electrode assembly is mounted inside the can.

The button-type secondary battery is manufactured in the form in which the electrode assembly is embedded in the can formed by coupling an upper can to a lower can.

The electrode assembly is manufactured by winding a separator, a negative electrode, a separator, and a positive electrode, which are in a stacked state, around a core. Thus, the electrode assembly has a structure a center hole is formed at a center after the core is removed and is manufactured so that electrode tabs (a negative electrode tab and a positive electrode tab) protrude upward and downward, respectively. Typically, when the electrode tab is seated in the lower can, the electrode tab disposed at an upper side is the positive electrode tab, and the electrode tab disposed at a lower side is the negative electrode tab. That is, when the electrode assembly is embedded, the upper can and the lower can are coupled and sealed so that the upper can and the lower can are electrically insulated from each other. Here, the upper can is connected to the positive electrode tab to form a positive electrode, and the lower can is connected to the negative electrode tab to form a negative electrode.

As illustrated in FIG. 1a, which illustrates a state in which the electrode tab is welded to the upper can in a process of assembling the button-type secondary battery according to the related art, in a state in which an electrode assembly 3 is mounted in a lower can 2 so that a negative electrode tab 3b of electrode tabs 3a and 3b according to the related art is disposed in a center hole, laser is irradiated to weld the negative electrode tab 3b on a bottom surface inside the lower can 2, and the positive electrode 3a is withdrawn to the outside and then is welded to an inner surface of the can 1 that is an upper can. After the welding is performed in a state in which the can 1 is disposed on the base 6 so that the inner surface thereof faces an upper side, the can 1 is press-fitted into an upper portion of the lower can 2 and then coupled.

When the welding is performed in the state in which the positive electrode tab 3a is disposed on the inner surface of the can 1, in a state in which a jig 7 having a pipe shape presses and fix the positive electrode tab, if the laser is irradiated from a laser irradiation device 5 through a hole of the jig 7, the positive electrode tab 3a is melted and welded to the can 1.

A resistance value between the electrode tab 3a and the can 1 varies in magnitude according to a length of a bead generated at the welded portion during the welding.

That is, referring to FIG. 1B, which illustrates a shape of the bead during weak welding and a shape of the bead during normal welding and a graph showing a difference in internal resistance during the weak welding and the normal welding, when the normal welding is performed to a sufficient length to form a bead having a long length, a contact area between the electrode tab 3a and the can 1 increases, and thus, DC resistance that is internal resistance between the electrode tab 3a and the can 1 relatively decrease. However, when the sufficient bead is not formed, and the weak welding is performed, the contact area between the electrode tab 3a and the can 1 is reduced, and thus, the magnitude of the DC resistance relatively increases.

DISCLOSURE OF THE INVENTION

Technical Problem

Therefore, a main object of the present invention is to provide a welding device for a button-type secondary battery, which is capable of determining whether welding defects occur immediately after welding is performed using a phenomenon, in which a magnitude of an internal resistance varies according to welding quality as described above.

Technical Solution

The present invention for achieving the above object provides a welding device for a button-type, which welds an electrode tab protruding from an electrode assembly to a can in which the electrode assembly is mounted, the welding device including: a base configured to support a bottom surface of the can when an inner surface of the can faces an upper side, and the electrode tab is in contact with the inner surface of the can; a jig disposed on the base to fix the electrode tab on the base and having an opening hole through which laser for welding the electrode tab to the can passes; a laser irradiation device configured to irradiate the laser to the opening hole when the jig fixes the electrode tab to the can; and four probes mounted on the base or the jig, wherein two probes of the probes are connected to a power source so that current flows to welding portions of the can and the electrode tab when the probes are in contact with the welding portions, and remaining two probes are connected to a voltmeter to measure voltages at the welding portions to be in contact with the welding portions. In the present invention, it has been described that the electrode tab is a positive electrode tab, and the can is an upper can. However, if the jig is insertable into a center hole of the electrode assembly, the electrode tab may be a negative electrode tab, and the can may be a lower can.

Two probes of the four probes may be installed on the jig, and two probes of the four probes may be installed on the base.

A gap between the two probes through which the current flows may be greater than that between the two probes connected to the voltmeter.

Alternatively, the two probes through which the current flows may be mounted on the jig, and the two probes connected to the voltmeter may be mounted on the base, or the two probes through which the current flows may be mounted on the base, and the two probes connected to the voltmeter may be mounted on the jig.

The probes may be disposed to be spaced a predetermined distance from a point at which the laser is irradiated.

The jig may be capable of ascending and descending to approach the base when descends and to be away from the base when ascends.

Each of the probes may be provided as a pogo pin that overcomes elastic force of a spring therein and is pressed.

The welding device may further include a controller that calculates resistance of each of the welding portions by calculating the current supplied from the power source and the voltage measured by the voltmeter, and compares the calculated resistance with input data to determine whether welding defects occur.

When the probes are mounted on the base or the jig, the probes may be mounted to be electrically insulated from the base and the jig.

Advantageous Effects

The welding device for the button-type secondary battery of the present invention having the technical properties as described above may determine immediately whether welding defects occur after the welding is performed by measuring the resistance between the electrode tab and the can.

The probes may be disposed to be spaced a predetermined distance from a point at which the laser is irradiated to prevent the heat damage by the laser from occurring.

The jig may be configured to ascend and descend so as to approach the base when descends and to be away from the base when ascends, thereby measuring the resistance of the secondary batteries having various sizes.

The probe may be provided as the pogo pin that overcomes the internal elastic force of the spring and is pressed, so that the probe is in contact with the surfaces of the electrode tab and the can at the appropriate pressure without leaving the scratch on the surfaces.

The controller that determines whether the welding defects occur by comparing the calculated resistance with the data that is input in advance may be further provided to more quickly determine whether the welding defects occur.

The probes may be mounted to be electrically insulated from the base or the jig, thereby preventing the measured values from being changed by the external factors.

MODE FOR CARRYING OUT THE INVENTION

Figure 1A:
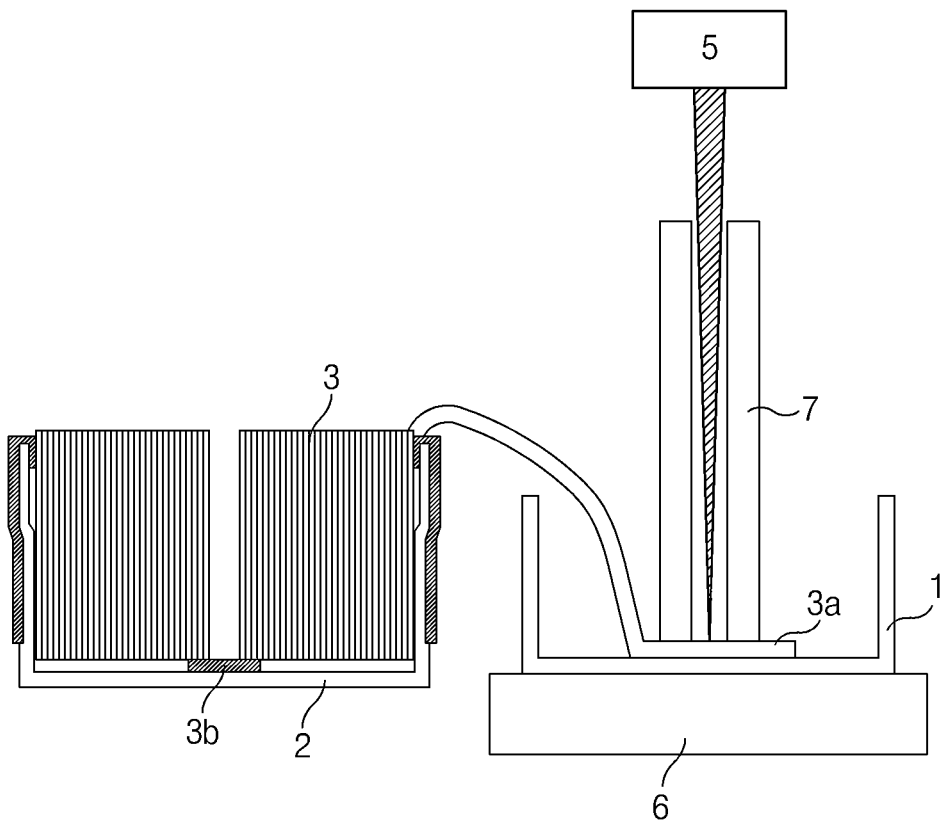
FIG. 1a is a view illustrating a state in which an electrode tab is welded to an upper can in a process of assembling a button-type secondary battery according to a related art.
Figure 1B:
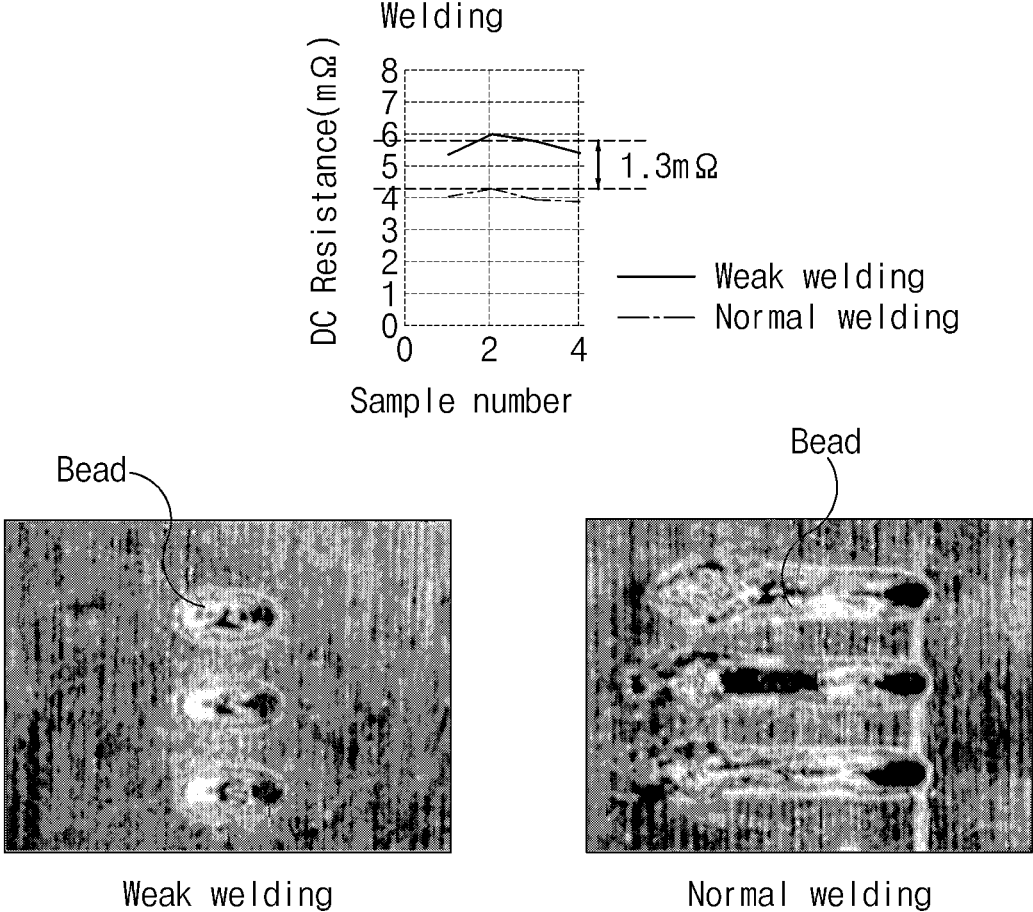
FIG. 1b is a view illustrating a shape of a bead during weak welding and a shape of the bead during normal welding and a graph showing a difference in internal resistance during the weak welding and the normal welding.

Hereinafter, preferred embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein.

In order to clearly describe the present invention, parts irrelevant to the description are omitted, and the same reference numerals are assigned to the same or similar components throughout the specification.

Also, terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways.

The present invention relates to a welding device for a button-type secondary battery, which is capable of determining whether defects in welding quality occur by applying power between an electrode tab (positive electrode tab) and a can (upper can) to calculate internal resistance and comparing numerical values of the internal resistance after the welding is performed using a phenomenon in which magnitude of the internal resistance varies according to the welding quality.

Hereinafter, embodiments according to the present invention will be described with reference to the accompanying drawings.

Embodiment 1

Figure 2:
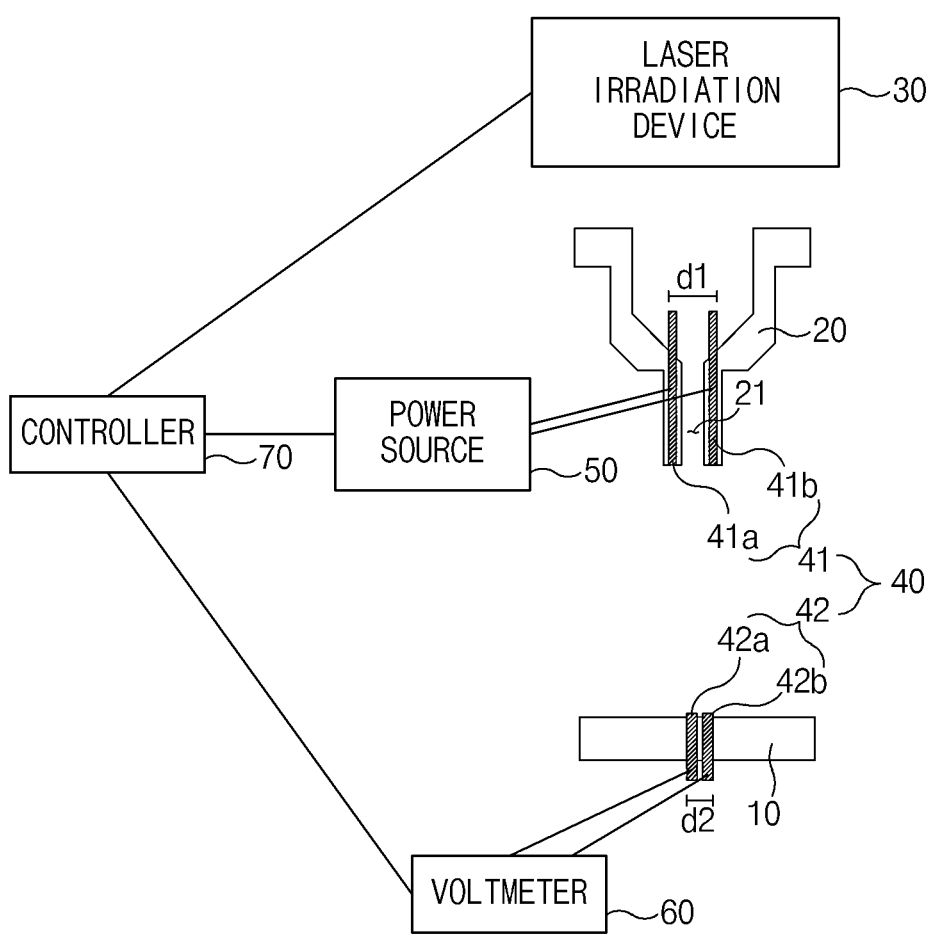
FIG. 2 is a simplified view illustrating a welding device for a button-type secondary battery according to the present invention.
Figure 3:
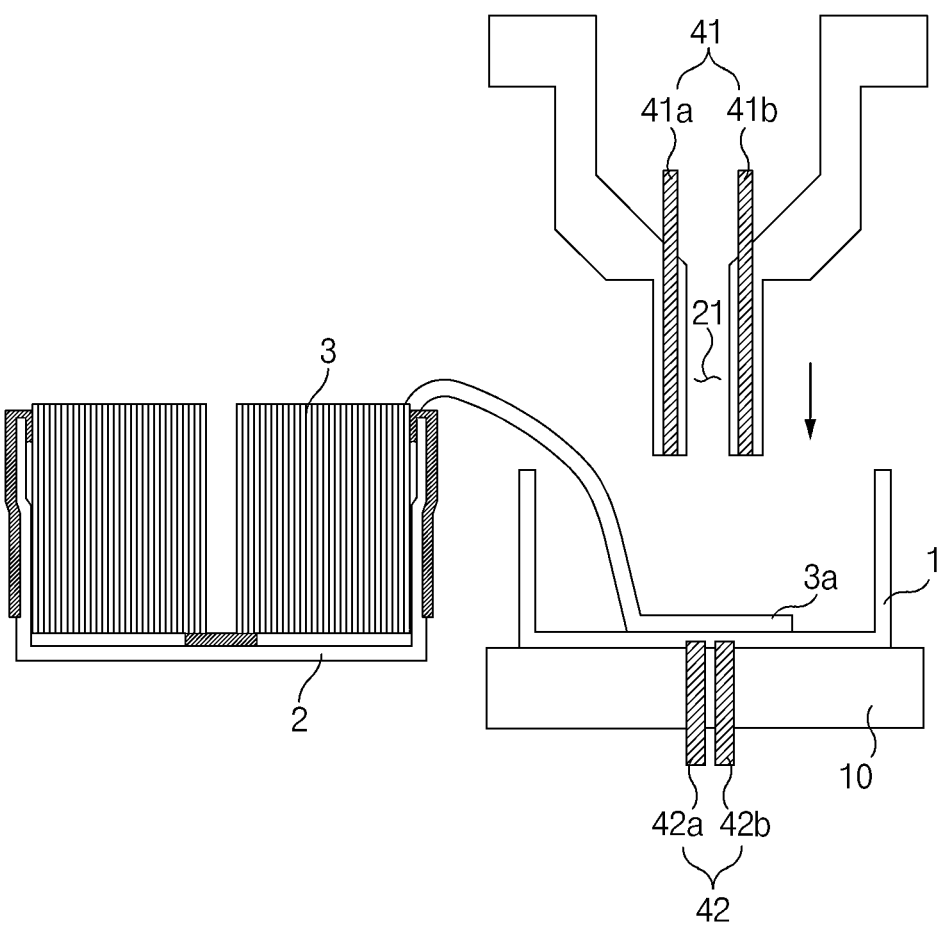
FIG. 3 is a view illustrating a state before a can and an electrode tab are seated on the welding device illustrated in FIG. 2, and a jig descends.
Figure 4:
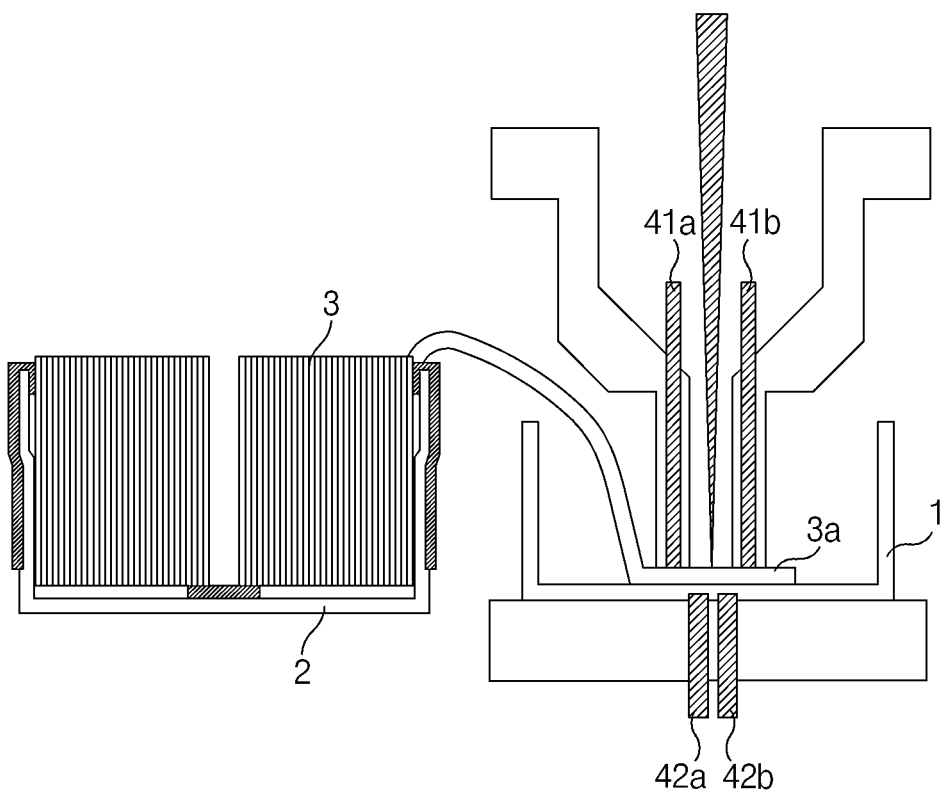
FIG. 4 is a view illustrating a state in which the jig descends, and laser is irradiated in the state of FIG. 2.

FIG. 2 is a simplified view illustrating a welding device for a button-type secondary battery according to the present invention, FIG. 3 is a view illustrating a state before a can and an electrode tab are seated on the welding device illustrated in FIG. 2, and a jig descends, and FIG. 4 is a view illustrating a state in which the jig descends, and laser is irradiated in the state of FIG. 2.

A welding device for a button-type secondary battery provided in this embodiment is provided to weld an electrode tab 3a protruding from an electrode assembly to a can 1 in which the electrode assembly 3 is mounted, and includes a base a jig 20, a laser irradiation device 30, and four probes 40 (41 and 42). In the present invention, it is assumed that the electrode tab 3a is a positive electrode tab, and the can 1 is an upper can. However, the electrode tab may be a negative electrode tab, and the can may be a lower can according to a welding position.

The base 10 is provided in a flat plate shape having a predetermined thickness to support a bottom surface of the can 1 when the electrode tab 3a is in contact with an inner surface of the can 1 and also has a structure in which a plurality of holes are punched vertically so that the probes 42 (42a and 42b) are inserted.

The jig 20 is disposed on the base 10 to press the electrode tab 3a disposed on the base 10 with a load, and an opening hole 21 is formed so that the laser for welding the electrode tab 3a to the can 1 passes therethrough. Although a size and shape of the jig 20 are not limited, a lower end seated on the electrode tab 3a has a size that is enough to be seated on the electrode tab 3a and has a sufficient thickness to prevent thermal damage during the laser irradiation. Also, it has a structure in which the plurality of holes are punched so that the probes 41 (41a and 41b) are inserted.

When the jig 20 fixes the electrode tab 3a to the can 1, the laser irradiation device 30 irradiates the laser through the opening hole 21 to melt the electrode tab 3a so as to be welded to the surface of the can 1.

The laser irradiation device 30 irradiates the laser in a state in which an output and an irradiation path are controlled so that a welding bead is formed with a predetermined width and length.

In addition, two probes 41a and 42a are mounted on the base 10, and two probes 41b and 42b are mounted on the jig 20, i.e., a total of four probes 40 (41 and 42) are mounted on the base 10 and the jig 20, respectively.

The two probes 41 (41a and 41b) of the probes 40 are connected to a power source 50 to be in contact with welding portions of the can 1 and the electrode tab 3a so that current flows to the welding portions, and the remaining two probes 42 (42a and 42b) are connected to a voltmeter 60 to measure voltages at the welding portions to be in contact with the welding portions.

Since the input current and voltage are known, resistance at the welding point may be calculated by Ohm's law.

Figure 6:
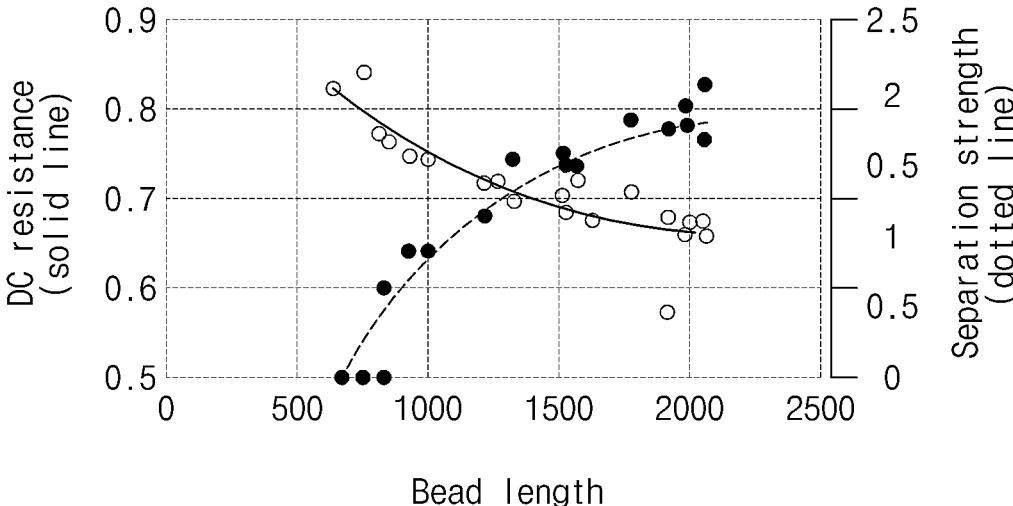
FIG. 6 is a graph illustrating a change of DC resistance and separation strength according to a length of a bead.

That is, as illustrated in FIG. 6, which illustrates a change in DC resistance and separation strength according to a length of the bead, it is seen that the longer the welded length, that is, the bead length, the lower the DC resistance value, and the separation strength between the electrode tab 3a and the cup 1 increases.

Therefore, if the output of the laser irradiated from the laser irradiation device 30 and the resistance value to a movement distance are higher than reference values, it may be determined as defective welding, and if the resistance value is within a predetermined reference value range, it may be determined as normal welding.

Therefore, the welding device for the button-type secondary battery provided in this embodiment may include a controller 70 that calculates the resistance of the welding portion by calculating the current supplied from the power source 50 and the voltage measured by the voltmeter 60, and compares the calculated resistance with input data to determine whether the welding defects occur.

When the resistance value is high, and thus, it is confirmed that the welding defects occur, the controller 70 may be interlocked or communicate with the laser irradiation device 30 so that the laser is additionally irradiated to the welded point and/or in the vicinity of the welded point.

As described above, the two probes of the four probes in this embodiment are installed on the jig 20, and the two probes are installed on the base 10 so that the resistance is measured at four points. Here, a gap d1 between the two probes 41a and 41b through which the current flows is provided to be wider than a gap d2 between the two probes 42a and 42b connected to the voltmeter 60. Here, it is preferable that the distance between the probes 41a, 41b, 42a, 42b are constantly maintained in the vertical direction (i.e., it is preferable that all of a gap between the probes 41a and 42a, a gap between the probes 42a and 42b, and a gap between probes 42b and 41b among the probes are constant).

Thus, while the current flows between the probes 41a and 41b mounted on the upper jig 20, a voltage may be measured through the probes 42a and 42b mounted on the lower base 10. Here, the resistance at the points (the welded points) that are in contact with the probes 40 may be calculated.

FIGS. 2 to 4, the two probes 41a and 41b through which the current flows are mounted on the jig 20, and the two probes 42a and 42b connected to the voltmeter 60 are mounted on the base 10. Alternatively, the two probes 41a and 41b through which the current flows are mounted on the base 10, and the two probes 42a and 42b connected to the voltmeter 60 may be mounted on the jig 20.

In addition, the probes 42a and 42b mounted on the base 10 are disposed to be spaced a predetermined distance from the point at which the laser is irradiated to prevent thermal damage from occurring by the welding. That is, the laser welding point is preferably determined between the probes 42a and 42b mounted on the base 10.

Furthermore, the jig 20 may be configured to ascend and descend so as to approach the base 10 when descends and to be away from the base 10 when ascends. In addition, when the probes 40 are mounted on the base 10 or the jig 20, it is preferable that the probes 40 are mounted to be electrically insulated from the base 10 or the jig 20 (for example, the probes are mounted in a state of being coupled to an insulating gasket on an outer surface that is in contact with the jig or the base or in a state of being coated with an insulating layer).

Embodiment 2

In the present invention, a probe provided as a pogo pin is provided as Embodiment 2.

Typically, a probe, which is commonly called a pogo pin, is a probe that is provided with a spring mounted therein and is contactable with an elastic force applied therein. In general, the probe is mainly used when examining an electronic circuit or a semiconductor chip.

Figure 5:
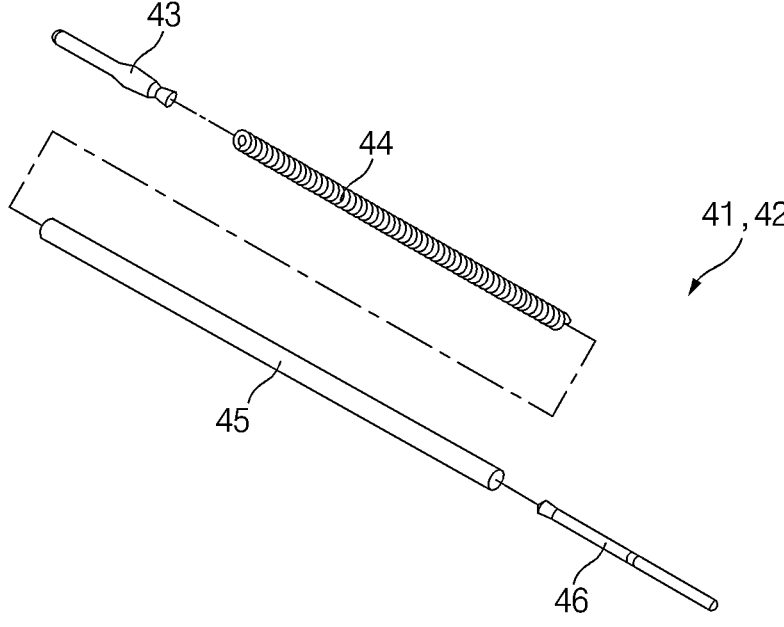
FIG. 5 is a view illustrating a state in which a probe having a pogo pin structure is disassembled.

Referring to FIG. 5, which illustrates an exploded view of the probe having the pogo pin structure, each of the probes 40 (41 and 42) provided in this embodiment includes a body 45 in a hollow pipe shape, a spring 44 inserted into the body 45, a first probe pin 43 having a portion inserted into one side of the body 45 and having an end fixed to one end of the spring 44, and a second probe pin 46 configured to support the other end of the spring 44 and having a portion inserted into the other side of the body 45.

Here, the first probe pin 43 and the second probe pin 46 are prevented from being separated from the body 45 and are coupled to press the spring 40 so that the spring is pressed by a predetermined distance (inserted into the body).

Also, any one of the first probe pin 43 and the second probe pin 46 is electrically connected to a power source 50 or a voltmeter 60 for applying current, and the other is disposed to be in contact with an electrode tab 3a or a can 1.

Thus, when the jig 20 is disposed on the electrode tab 3a and the can 1 in a state in which the electrode tab 3a and the can 1 are seated on the base 10, in the probes 41 and 42 having the above-described pogo pin structure, since the probe pins 43 and 46 are retracted by the pressing of the spring 44, the stable contact of the electrode tab 3*a* and the can 1 while maintaining the electrical connection may be secured.

The spring 44 is made of a metal having electrical conductivity so that the first probe pin 43 and the second probe pin 46 are electrically connected, and an insulating layer may be applied to an outer surface of the body 45 so as to be insulated from the base 10 and the jig 20.

The welding device for the button-type secondary battery of the present invention having the technical properties as described above may determine immediately whether welding defects occur after the welding is performed by measuring resistance between the electrode tab 3*a* and the can 1.

The probes 40 may be disposed to be spaced a predetermined distance from a point at which laser is irradiated, thereby preventing thermal damage from occurring by the laser.

The jig 20 may be configured to ascend and descend so as to approach the base 10 when descends and to be away from the base 10 when ascends, thereby measuring the resistance of the secondary batteries having various sizes.

The probe 40 may be provided as a pogo pin that overcomes internal elastic force of the spring and is pressed, so that the probe is in contact with the surfaces of the electrode tab 3*a* and the can 1 at the appropriate pressure without leaving scratch on the surfaces.

A controller 70 that determines whether the welding defects occur by comparing the calculated resistance with the data that is input in advance may be further provided to more quickly determine whether the welding defects occur.

The probes 40 may be mounted to be electrically insulated from the base 10 or the jig 20, thereby preventing the measured values from being changed by the external factors.

While the embodiments of the present invention have been described with reference to the specific embodiments, it will be apparent to those skilled in the art that various changes and modifications may be made without departing from the spirit and scope of the invention as defined in the following claims.

DESCRIPTION OF THE SYMBOLS

10: Base
20: Jig
30: Laser irradiation device
40: Probe
50: Power source
60: Voltmeter
70: controller

The invention claimed is:

1. A welding device, which welds an electrode tab protruding from an electrode assembly of a button-type battery to a can of the button-type battery in which the electrode assembly is mounted, the welding device comprising:

a base configured to support a bottom surface of the can with an inner surface of the can facing in an upward direction, and the electrode tab with a lower surface of the electrode tab being in contact with the inner surface of the can;

a jig disposed on the base to fix the electrode tab to the inner surface of the can, the jig having an opening hole through which a laser light for welding the electrode tab to the can passes;

a laser irradiation device configured to irradiate the laser light to the opening hole when the jig fixes the electrode tab to the can; and four probes mounted on the base or the jig, wherein two probes of the probes are connected to a power source so that current flows to welding portions of the can and the electrode tab when the probes are in contact with the welding portions, and the remaining two probes are connected to a voltmeter to measure voltages at the welding portions to be in contact with the welding portions, wherein two probes of the four probes are on the jig at opposing sides of the opening hole and configured to contact an upper surface of the electrode tab, and wherein two probes of the four probes are on the base and configured to contact the bottom surface of the can.

2. The welding device of claim 1, wherein a first gap is defined between the two probes through which the current flows, and a second gap is defined between the two probes connected to the voltmeter, and wherein the first gap is larger than the second gap.

3. The welding device of claim 2, wherein the two probes through which the current flows are mounted on the jig, and the two probes connected to the voltmeter are mounted on the base.

4. The welding device of claim 2, wherein the two probes through which the current flows are mounted on the base, and the two probes connected to the voltmeter are mounted on the jig.

5. The welding device of claim 1, wherein the probes are disposed to be spaced a predetermined distance from a point at which the laser light is irradiated.

6. The welding device of claim 1, wherein the jig is capable of ascending and descending to approach the base when descends and to be away from the base when ascends.

7. The welding device of claim 1, wherein each of the probes includes a pogo pin that overcomes elastic force of a spring therein and is pressed.

8. The welding device of claim 7, further comprising a controller that calculates resistance of each of the welding portions by calculating the current supplied from the power source and the voltage measured by the voltmeter, and compares the calculated resistance with input data to determine whether a welding defect occur.

9. The welding device of claim 7, wherein, when the probes are mounted on the base or the jig, the probes are electrically insulated from the base and the jig.

10. The welding device of claim 1, further comprising a controller to calculate resistance of each of the welding portions by calculating the current supplied from the power source and the voltage measured by the voltmeter, and compares the calculated resistance with input data to determine whether a welding defect occur.

11. The welding device of claim 3, further comprising a controller to calculate resistance of each of the welding portions by calculating the current supplied from the power source and the voltage measured by the voltmeter, and compares the calculated resistance with input data to determine whether a welding defect occur.

* * * * *